US011541874B2

(12) United States Patent
Lee

(10) Patent No.: US 11,541,874 B2
(45) Date of Patent: Jan. 3, 2023

(54) APPARATUS, SYSTEM AND METHOD FOR CONTROLLING VEHICLE

(71) Applicants: HYUNDAI MOTOR COMPANY, Seoul (KR); KIA MOTORS CORPORATION, Seoul (KR)

(72) Inventor: Yong Joon Lee, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 262 days.

(21) Appl. No.: 17/073,790

(22) Filed: Oct. 19, 2020

(65) Prior Publication Data
US 2021/0402983 A1 Dec. 30, 2021

(30) Foreign Application Priority Data
Jun. 30, 2020 (KR) .................. 10-2020-0080431

(51) Int. Cl.
| B60W 30/02 | (2012.01) |
| B60W 10/20 | (2006.01) |
| B60W 10/18 | (2012.01) |
| B60W 10/06 | (2006.01) |

(Continued)

(52) U.S. Cl.
CPC .............. B60W 30/02 (2013.01); B60T 7/12 (2013.01); B60T 8/176 (2013.01); B60W 10/06 (2013.01);

(Continued)

(58) Field of Classification Search
CPC ...... B60W 30/02; B60W 10/06; B60W 10/11; B60W 10/18; B60W 10/20;
(Continued)

(56) References Cited

U.S. PATENT DOCUMENTS

2019/0184981 A1* 6/2019 Jung .................... B60W 30/095
2020/0307631 A1* 10/2020 Tsuji ........................ B60Q 1/48
(Continued)

FOREIGN PATENT DOCUMENTS

| CN | 104700594 A | * | 6/2015 | ............... B60Q 1/44 |
| JP | 2015089733 A | * | 5/2015 | ............. G01S 15/08 |

(Continued)

OTHER PUBLICATIONS

Dawei et al., "The fault-tolerant control of tilt sensor for EPB," 2015, Publisher: IEEE.*
(Continued)

*Primary Examiner* — Tuan C To
(74) *Attorney, Agent, or Firm* — Morgan, Lewis & Bockius LLP

(57) ABSTRACT

An apparatus for controlling a vehicle includes: a sensor that obtains vehicle surrounding environment information and vehicle driving information; and a controller that determines whether an engagement of an Electronic Parking Brake (EPB) is possible based on the vehicle driving information, performs control for preventing a slip based on the vehicle surrounding environment information upon determining that the engagement of the EPB is impossible, calculates a steering angle for preventing the slip, transmits the steering angle to a portable terminal, receives a steering control command from the portable terminal, and controls steering based on the received steering control command.

20 Claims, 14 Drawing Sheets

(51) Int. Cl.
  *B60W 40/10*     (2012.01)
  *B60W 50/14*     (2020.01)
  *B60W 40/076*    (2012.01)
  *B60W 30/095*    (2012.01)
  *B60W 10/11*     (2012.01)
  *B60T 7/12*      (2006.01)
  *B60T 8/176*     (2006.01)

(52) U.S. Cl.
  CPC ............ *B60W 10/11* (2013.01); *B60W 10/18* (2013.01); *B60W 10/20* (2013.01); *B60W 30/0956* (2013.01); *B60W 40/076* (2013.01); *B60W 40/10* (2013.01); *B60W 50/14* (2013.01); *B60T 2210/20* (2013.01); *B60T 2210/30* (2013.01); *B60T 2260/02* (2013.01); *B60T 2260/09* (2013.01); *B60T 2270/10* (2013.01); *B60W 2510/20* (2013.01); *B60W 2520/00* (2013.01); *B60W 2554/20* (2020.02); *B60W 2554/4041* (2020.02); *B60W 2556/10* (2020.02)

(58) Field of Classification Search
  CPC ........... B60W 30/0956; B60W 40/076; B60W 40/10; B60W 50/14; B60W 2554/20; B60W 2554/4041; B60W 2556/10; B60W 2510/20; B60W 2520/00; B60T 7/12; B60T 8/176; B60T 2210/20; B60T 2210/30; B60T 2260/02; B60T 2260/09; B60T 2270/10

USPC .......................................................... 701/41
  See application file for complete search history.

(56) References Cited

U.S. PATENT DOCUMENTS

| 2020/0307640 | A1* | 10/2020 | Tsuji ..................... B60W 10/20 |
| 2020/0307643 | A1* | 10/2020 | Ikeda ..................... B60K 35/00 |
| 2020/0307646 | A1* | 10/2020 | Kato .................. B60W 60/0054 |
| 2020/0334924 | A1* | 10/2020 | Wells ...................... H04L 67/04 |
| 2020/0361431 | A1* | 11/2020 | Park ...................... B60T 13/662 |
| 2021/0009091 | A1* | 1/2021  | Koshiba ............ B60W 50/0205 |
| 2021/0374947 | A1* | 12/2021 | Shin ...................... G06T 7/0012 |
| 2021/0397940 | A1* | 12/2021 | Schneider .............. G06N 3/049 |

FOREIGN PATENT DOCUMENTS

| KR | 10-1998-054228 A | 9/1998 |
| KR | 10-2013-0045698 A | 5/2013 |
| KR | 10-1735730 B1 | 5/2017 |

OTHER PUBLICATIONS

Simone et al., "Data-Driven Clamping Force Control for an Electric Parking Brake Without Speed Measurement," 2018, Publisher: IEEE.*

* cited by examiner

DRIVING DIRECTION

DRIVING DIRECTION

→ DRIVING DIRECTION

→ DRIVING DIRECTION

DRIVING DIRECTION

DRIVING DIRECTION

APPARATUS, SYSTEM AND METHOD FOR CONTROLLING VEHICLE

CROSS-REFERENCE TO RELATED APPLICATION

This application claims the benefit of priority to Korean Patent Application No. 10-2020-0080431, filed in the Korean Intellectual Property Office on Jun. 30, 2020, the entire contents of which are incorporated herein by reference.

TECHNICAL FIELD

The present disclosure relates to an apparatus, system and method for controlling a vehicle.

BACKGROUND

An Electronic Parking Brake (EPB) device, which is an electronic parking device, performs a function of maintaining a parking state in which the vehicle does not advance forward even when the brake pedal is not depressed. In case of waiting for a long time, the EPB device is useful to the driver because the EPB device does not allow the vehicle to move forward even if the brake is not continuously applied.

However, in a state where a vehicle is parked on a sloping road, when the EPB device operates abnormally, the brake is not completed and the vehicle slips (slides and moves) along the sloping road, causing a large accident. Therefore, there is a need to develop a technology capable of fundamentally preventing slip when a vehicle is parked on a sloping road.

The information included in this Background section is only for enhancement of understanding of the general background of the present disclosure and may not be taken as an acknowledgement or any form of suggestion that this information forms the prior art already known to a person skilled in the art.

SUMMARY

The present disclosure has been made to solve the above-mentioned problems occurring in the prior art while advantages achieved by the prior art are maintained intact.

An aspect of the present disclosure provides an apparatus, a system and a method for controlling a vehicle capable of securing safety by fundamentally preventing slip when a vehicle is parked on a sloping road.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes: a sensor that obtains vehicle surrounding environment information and vehicle driving information; and a controller that determines whether an engagement of an Electronic Parking Brake (EPB) is possible based on the vehicle driving information, performs control for preventing a slip based on the vehicle surrounding environment information upon determining that the engagement of the EPB is impossible, calculates a steering angle for preventing the slip, transmits the steering angle to a portable terminal, receives a steering control command from the portable terminal, and controls steering based on the received steering control command.

The controller may operate the EPB and may further determine whether the slip occurs after the EPB is engaged when the controller determines that the engagement of the EPB is possible.

The controller may determine whether a re-engagement of the EPB is possible when the controller determines that the slip occurs after the EPB is engaged.

The controller may perform the control for preventing the slip when the controller determines that the re-engagement of the EPB is impossible.

The controller may determine a slope of a road based on the vehicle surrounding environment information, and perform the control for preventing the slip based on the slope of the road when the controller determines that the vehicle is located on a sloping road.

The control for preventing the slip may include control for restarting an engine at a time when the engine is turned off and changing a transmission gear ratio based on the vehicle driving information.

The controller may transmit a control history and a return request message of a user to the portable terminal when the control for preventing the slip is performed.

The controller may calculate the steering angle based on a movement trajectory of the vehicle and a location of an obstacle when the slip occurs.

The controller may determine that a curb is located at a left side of the vehicle based on the vehicle surrounding environment information, and determine a steering direction to left when the controller determines that the vehicle is parked at a left side of a driving direction of the vehicle.

The controller may determine that a curb is located at a right side of the vehicle based on the vehicle surrounding environment information, and determine a steering direction to right when the controller determines that the vehicle is parked at a right side of a driving direction of the vehicle.

According to another aspect of the present disclosure, a system for controlling a vehicle includes a portable terminal that generates a steering control command, and a vehicle driving control apparatus that obtains vehicle surrounding environment information and vehicle driving information, determines whether an engagement of an electronic parking brake is possible based on the vehicle driving information, performs control for preventing a slip based on the vehicle surrounding environment information when the engagement of the electronic parking brake is impossible, calculates a steering angle for preventing the slip, transmits the calculated steering angle to the portable terminal, receives a steering control command from the portable terminal, and controls steering based on the received steering control command.

According to still another aspect of the present disclosure, a method of controlling a vehicle includes obtaining vehicle surrounding environment information and vehicle driving information, determining whether an engagement of an electronic parking brake (EPB) is possible based on the vehicle driving information to perform control for preventing the slip based on the vehicle surrounding environment information when the engagement of the EPB is impossible, calculating a steering angle for preventing the slip and transmitting the calculated steering angle to a portable terminal, and receiving a steering control command from the portable terminal and controlling steering based on the received steering control command.

The method may further include operating the EPB and determining whether the slip occurs after the EPB is engaged when it is determined that the engagement of the EPB is possible.

The method may further include determining whether a re-engagement of the EPB is possible when it is determined that the slip occurs after the EPB is engaged.

The method may further include performing the control for preventing the slip when it is determined that the re-engagement of the EPB is impossible.

The method may further include determining a slope of a road based on the vehicle surrounding environment information, wherein the control for preventing the slip is performed based on the slope of the road when it is determined that the vehicle is located on a sloping road.

The control for preventing the slip may include control for restarting an engine at a time when the engine is turned off and changing a transmission gear ratio based on the vehicle driving information.

The method may further include transmitting a control history and a return request message of a user to the portable terminal when the control for preventing the slip is performed.

The steering angle may be calculated based on a movement trajectory of the vehicle and a location of an obstacle when the slip occurs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
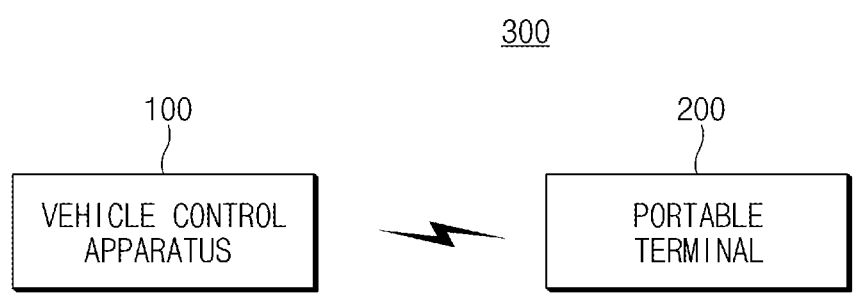
FIG. 1 is a block diagram illustrating the configuration of a vehicle control system according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating the configuration of a vehicle control system according to an embodiment of the present disclosure.

As shown in FIG. 1, a vehicle control system 300 according to an embodiment of the present disclosure may include a vehicle control apparatus 100 and a portable terminal 200.

The vehicle control apparatus 100 may obtain vehicle surrounding environment information, determine whether an electronic parking brake is operable, perform control for preventing a slip based on the vehicle surrounding environment information when an operation of the electronic parking brake is impossible, calculate a steering angle for preventing the slip, transmit the calculated steering angle to the portable terminal 200, receive a steering control command from the portable terminal 200, and control steering based on the received steering control command. The more details of the vehicle control apparatus will be described with reference to FIG. 2.

The portable terminal 200 may communicate with the vehicle control apparatus 100, and according to an embodiment of the present disclosure, may include a portable electronic device including a user's smart phone, a smart pad, a laptop computer, and the like. When the control history performed and a return request message of a user are received from a vehicle, the portable terminal 200 may generate a steering control command capable of controlling steering of the vehicle and transmit it to the vehicle. More details of the portable terminal will be described with reference to FIG. 3.

Figure 2:
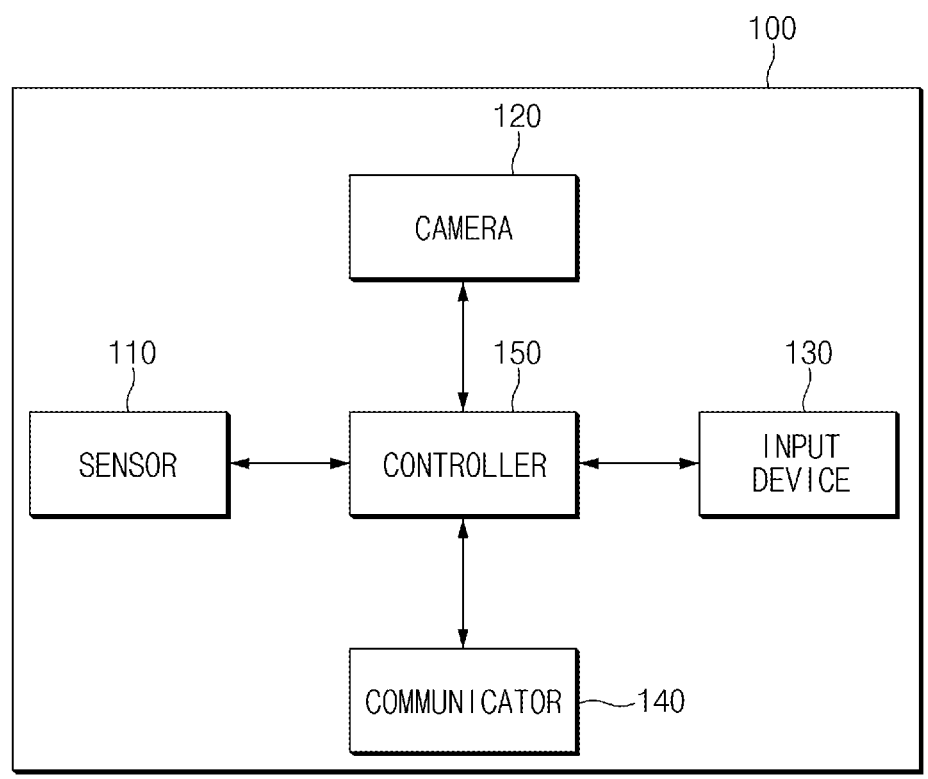
FIG. 2 is a block diagram illustrating the configuration of a vehicle control apparatus according to an embodiment of the present disclosure.

FIG. 2 is a block diagram illustrating the configuration of a vehicle control apparatus according to an embodiment of the present disclosure.

As shown in FIG. 2, the vehicle control apparatus 100 may include a sensor 110, a camera 120, an input device 130, a communicator 140, and a controller 150.

The sensor 110 may obtain vehicle surrounding environment information. The sensor 110 may detect an object outside the vehicle such as a vehicle in front or rear of the vehicle, a slope of a road, a surrounding structure of the vehicle, an approaching vehicle in the opposite lane, and the like. In this case, the surrounding structure of the vehicle may include a curbstone installed around a road. According to an embodiment, the sensor 110 may include an ultrasonic sensor that detects a distance by measuring a time until a reflected wave reflected by an object is received after emitting an ultrasonic pulse to a target. In addition, the sensor 110 may obtain ground information or line information of a road by detecting a line marking of the road or a signal reflected by the road surface.

In addition, the sensor 110 may obtain vehicle driving information. According to an embodiment, the sensor 110 may detect a state in which an electronic parking brake (EPB) device of a vehicle is coupled to a braking device (not shown). In this case, when the electronic parking brake receives a user input signal (electronic parking brake operation signal) from the input device 130, the electronic parking brake is operated to be coupled to the braking device (not shown) under control of the controller 150, so that the vehicle is braked. In this case, the braking device may be changed corresponding to the braking scheme (drum braking scheme, disc braking scheme). In addition, the sensor 110 may detect a gear ratio of a vehicle, a distance traveled by the vehicle (movement distance of a wheel), and a steering angle of the vehicle.

The camera 120 may obtain vehicle surrounding environment information in the form of an image, and may be implemented with a plurality of image sensors. The camera 120 may include front, left, right and rear cameras, where the front camera is provided in front of the vehicle to obtain an image of the front of the vehicle, and the left and right cameras obtain images of the left and right sides of the vehicle, and the rear camera is provided at the rear of the vehicle to obtain an image of the rear of the vehicle.

The input device 130 may receive an input signal corresponding to a manipulation, an operation or a voice of a user and according to an embodiment of the present disclosure, the input device 130 may receive an operation of a user. To this end, the input device 130 may be implemented with a scroll wheel, a button, a knob, and a switch that can be operated by a user.

The communicator 140 may perform wireless communication with the portable terminal 200. According to an embodiment, the communicator 140 may communicate with the portable terminal 200 in various communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment, the communicator 140 may transmit the steering direction and steering angle calculated from the vehicle control apparatus to the portable terminal 200 and receive a steering control command generated from the portable terminal 200.

The controller 150 may be implemented with various processing devices such as a microprocessor equipped with a semiconductor chip capable of performing operations or executions of various commands, and may control the operation of the vehicle control apparatus according to an embodiment. In detail, the controller 150 may determines whether the electronic parking brake is operable based on the vehicle driving information, perform control for preventing a slip based on the vehicle surrounding environment information when an operation of the electronic parking brake is impossible, calculate a steering angle for preventing the slip, transmit the steering angle to the portable terminal, receive a steering control command from the portable terminal, and control steering based on the received steering control command.

First, the controller 150 may determine the parking location based on the vehicle surrounding environment information. According to an embodiment, when the vehicle is parked in an automatic parking scheme, the controller 150 may determine whether the parking location of the vehicle is located at the left or right side based on the driving direction of the vehicle after the automatic parking operation is completed. In addition, when the vehicle is parked in a manual parking scheme, the controller 150 may determine the location of the surrounding structure when the engine is turned off after the manual parking operation is completed. According to an embodiment, the controller 150 may determine whether a surrounding structure such as a curb is located close to the left or right side of the vehicle based on the driving direction of the vehicle. More details will be described with reference to FIGS. 3 and 4.

Figure 3:
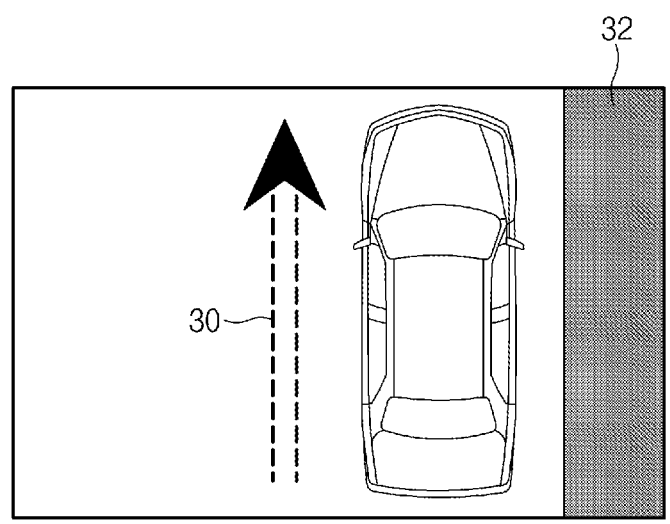
FIGS. 3 and 4 are views illustrating the locations of the vehicle and the surrounding structure determined according to an embodiment of the present disclosure.
Figure 4:
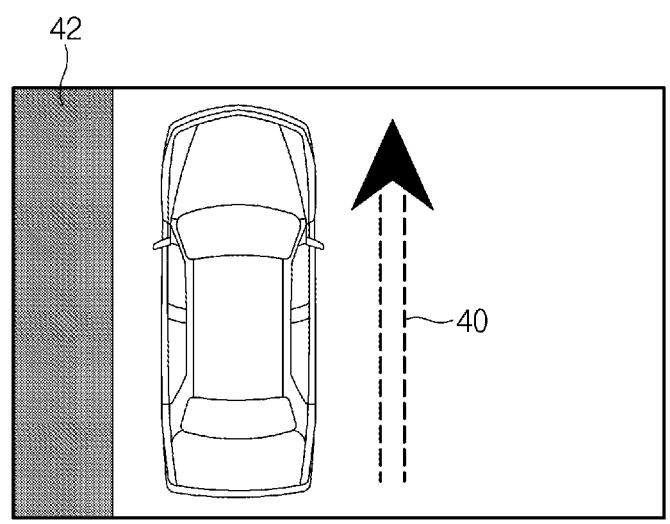

FIGS. 3 and 4 are views illustrating the locations of the vehicle and the surrounding structure determined according to an embodiment of the present disclosure.

As shown in FIG. 3, when the controller 150 determines a driving direction 30 of the vehicle based on the information detected by the sensor 110 and the camera 120, it may be determined that the parking location of the vehicle is at the right side of the driving direction 30. In addition, the controller 150 may determine that a surrounding structure 32 is located close to the right side based on the driving direction 30 of the vehicle. In addition, as illustrated in FIG. 4, when a driving direction 40 of the vehicle is determined based on the information detected by the sensor 110 and the camera 120, the controller 150 may determine that the parking location of the vehicle is at the left side of the driving direction 40. In addition, the controller 150 may determine that a surrounding structure 42 is located close to the left side based on the driving direction 40 of the vehicle.

The controller 150 may determine the slope of the road based on the vehicle surrounding environment information. In this case, the slope of the road may be determined based on the angle between the ground surface and the road surface, and the slope may be determined based on an image obtained through the front or rear camera. According to an embodiment, the controller 150 may determine whether the vehicle is parked on an uphill or downhill road based on the slope of the road.

When it is determined that the vehicle is parked on an uphill or downhill road, the controller 150 may determine that the transmission shift lever of the vehicle is positioned in 'P' at the time when the vehicle is parked, and determine whether the engagement of the electronic parking brake is completed. When the transmission shift lever is positioned in 'P' and it is determined that the engagement of the brake is completed, the controller 150 may determine whether the slip (sliding on the slope road) occurs after the vehicle is turned off. In this case, the controller 150 may determine that the slip has occurred when information about the distance traveled of the wheel is received in the ignition-on state for a predetermined time (e.g., one minute) after the vehicle is turned off.

Although it is determined that the engagement of the electronic parking brake is completed, when it is determined that the slip occurs, the controller 150 may determine whether the re-engagement of the electronic parking brake is possible. When it is determined that the re-engagement of the electronic parking brake is possible, the controller 150 may control the engine to restart, and control the electronic parking brake to be re-engaged, and then turn off the engine. Thereafter, the controller 150 may control to transmit the control history (history of engine restart and start-off) performed after the slip to the portable terminal 200. In addition, the controller 150 may control to transmit the vehicle surrounding image obtained through the camera 120 to the portable terminal 200.

When it is determined that the engagement of the electronic parking brake is not completed, the controller 150 may determine whether the re-engagement is possible. When it is determined that the engagement is possible, the controller 150 receives the operation signal of the electronic parking brake again at the time when the vehicle is turned off, such that the engagement of the electronic parking brake is completed.

However, when it is determined that the engaging force of the electronic parking brake is lowered or a failure occurs so that it is determined that the engagement or re-engagement is impossible, the controller 150 may restart the engine at the time when the engine is turned off and control the transmission gear to be changed in a direction opposite to the slope direction. According to an embodiment, when it is determined that the vehicle is parked on an uphill road, the controller 150 may change the transmission gear to stage 'D'. When it is determined that the vehicle is parked on a downhill slope, the controller 150 may change the transmission gear to stage 'R'. In addition, when it is determined that the vehicle is parked on a flat road, the controller 150 may change the transmission gear to stage 'N'.

The controller 150 may transmit the control history and a message requesting the user to return to the vehicle to the portable terminal 200 after determining that the engagement of the electronic parking brake is impossible. The controller 150 may wait until a steering control command is received from the portable terminal 200 and calculate a steering angle and steering direction optimal to prevent the slip. In addition, the controller 150 may transmit the calculated steering angle and steering direction to the portable terminal 200. More details will be described with reference to FIGS. 5A, 5B, 6A, 6B, 7A, 7B, 8A, 8B, 9A, 9B, 10A, and 10B.

FIGS. 5A, 5B, 6A and 6B are views illustrating a steering direction calculated on an uphill road according to an embodiment of the present disclosure. FIGS. 7A, 7B, 8A, 8B, 9A, 9B, 10A and 10B are views illustrating a steering direction calculated according to the location of a surrounding structure and the type of a sloping road.

Figure 5A:
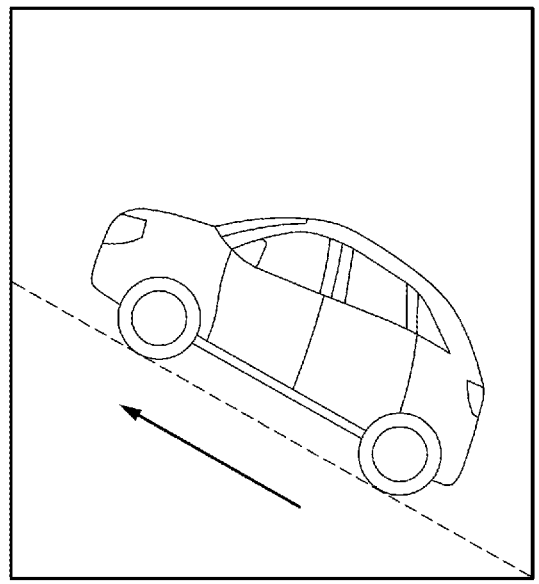
FIGS. 5A, 5B, 6A and 6B are views illustrating a steering direction calculated on an uphill road according to an embodiment of the present disclosure.
Figure 5B:
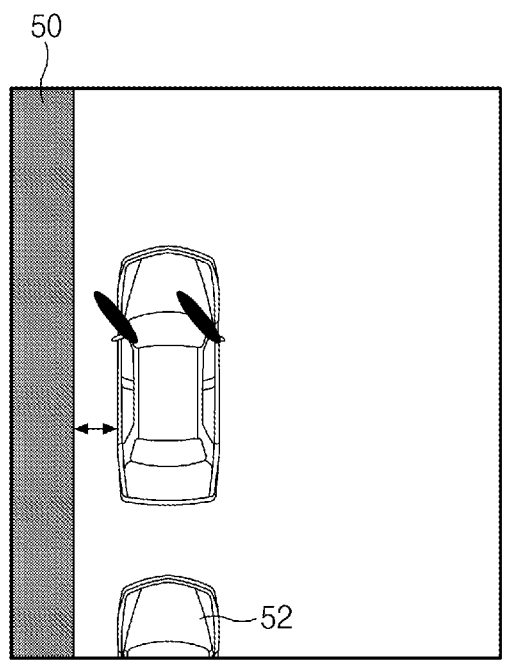
Figure 6A:
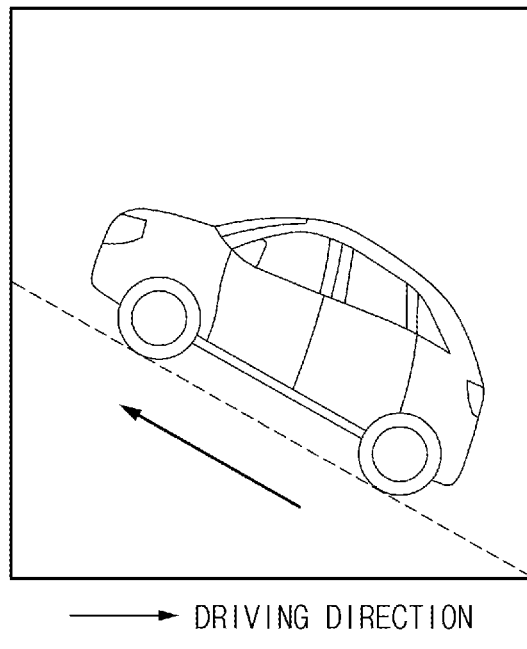
Figure 6B:
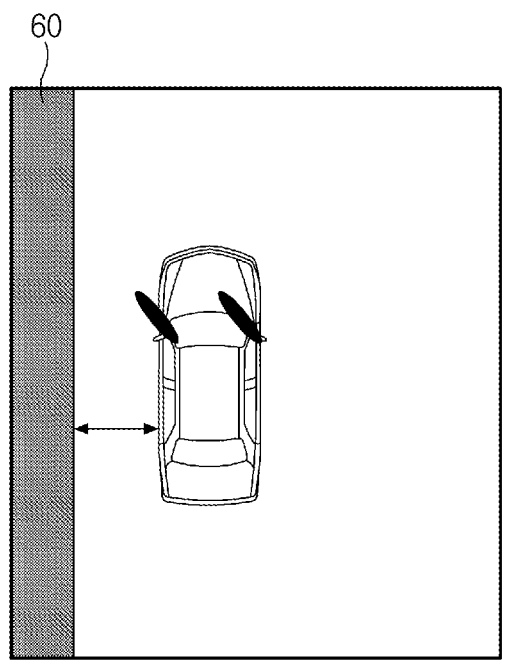

As shown in FIGS. 5A and 5B, the controller 150 may determine that the vehicle is parked on an uphill road, a surrounding structure 50 is located nearby within a specified distance at the left side of the vehicle, and an obstacle 52 is located in the rear of the vehicle. As shown in FIGS. 6A and 6B, the controller 150 may determine that the vehicle is parked on an uphill road and the surrounding structure 50 is spaced apart from the left side of the vehicle beyond a specified distance. In this case, the controller 150 may calculate the steering angle based on the distance by which the obstacle 52 is spaced apart from the vehicle corresponding to the distance by which the surrounding structure 50 is spaced apart from the vehicle. According to an embodiment, the controller 150 may decrease the steering angle as the surrounding structure 50 approaches the vehicle and increase the steering angle as the surrounding structure 50 moves away from the vehicle. In addition, the controller 150 may increase the steering angle as the obstacle 52 approaches the vehicle and decrease the steering angle as the obstacle 52 moves away from the vehicle. In addition, the controller 150 may transmit the largest value of the calculated steering angles to the portable terminal 200.

For example, when the maximum left steering angle is −350° and the maximum right steering angle is +350°, in case of FIGS. 5A and 5B, the controller 150 may calculate a steering angle of −100° based on the surrounding structure 50 and a steering angle of −350° based on the rear obstacle 52, and transmit the calculated steering angle of −350° to the portable terminal 200. In addition, in case of FIGS. 6A and 6B, the controller 150 may calculate a steering angle of −350° based on the surrounding structure 50 and transmit the calculated steering angle of −350° to the portable terminal 200.

In addition, referring to FIGS. 7A, 7B, 8A, 8B, 9A, 9B, 10A and 10B, the controller 150 may determine the steering direction corresponding to the location of the surrounding structure and the type of a slop road based on the vehicle.

Figure 7A:
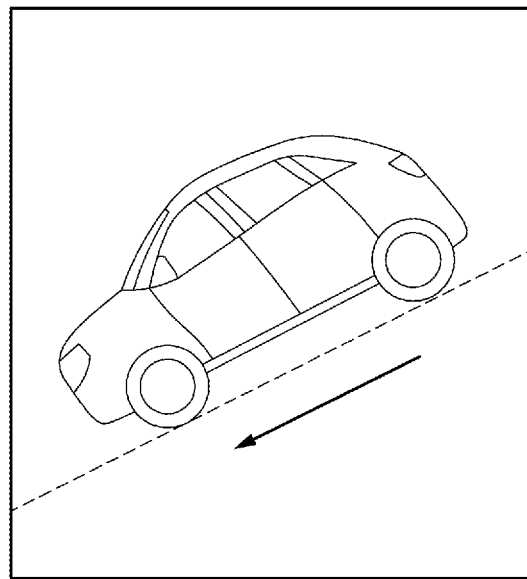
FIGS. 7A, 7B, 8A, 8B, 9A, 9B, 10A and 10B are views illustrating a steering direction calculated according to the location of a surrounding structure and the type of a sloping road.
Figure 7B:
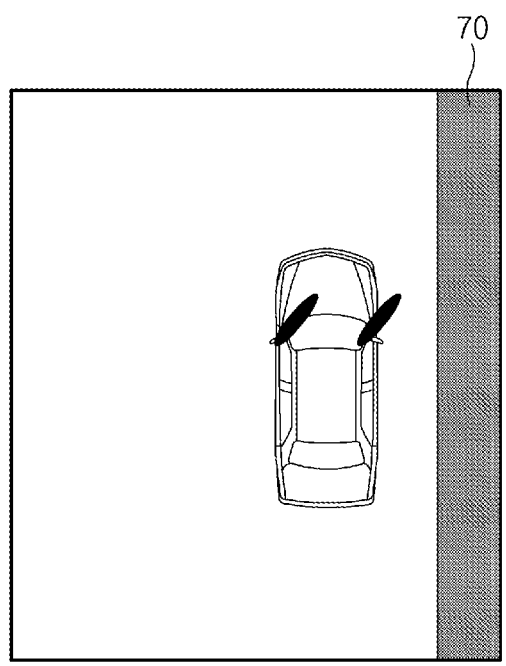
Figure 8A:
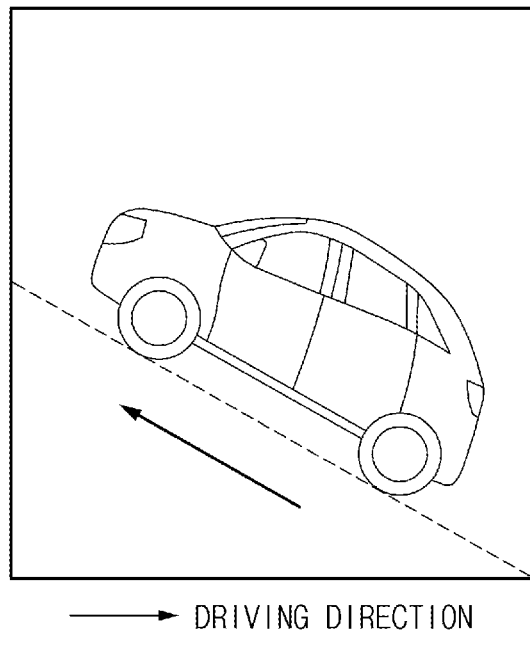
Figure 8B:
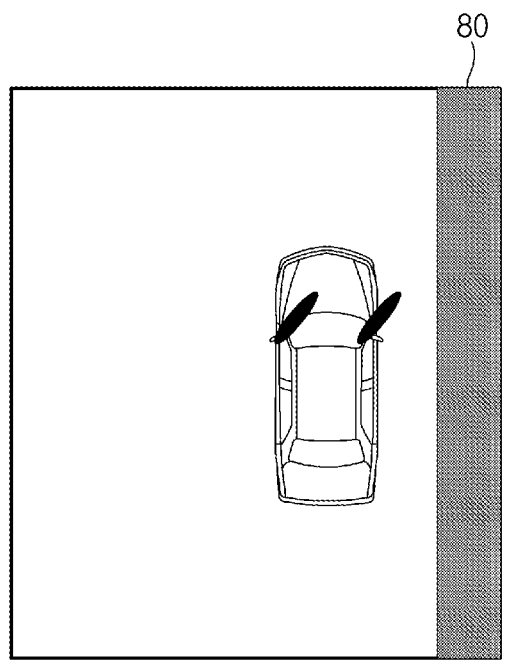

As shown in FIGS. 7A and 7B, when the controller 150 determines that the vehicle is located on a downhill road and a surrounding structure 70 is located at an adjacent position within a specified distance from the right side of the vehicle, the controller 150 may determine the right as the steering direction. As shown in FIGS. 8A and 8B, when the controller 150 determines that the vehicle is located on an uphill road and the surrounding structure 70 is located within a specified distance from the right side of the vehicle, the controller 150 may determine the right as the steering direction.

Figure 9A:
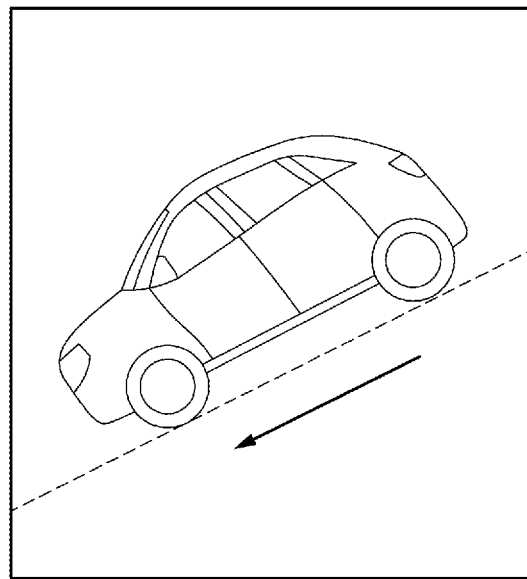
Figure 9B:
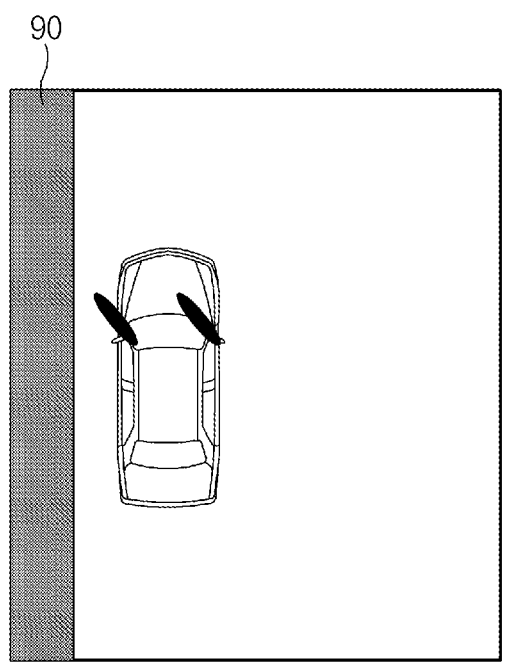
Figure 10A:
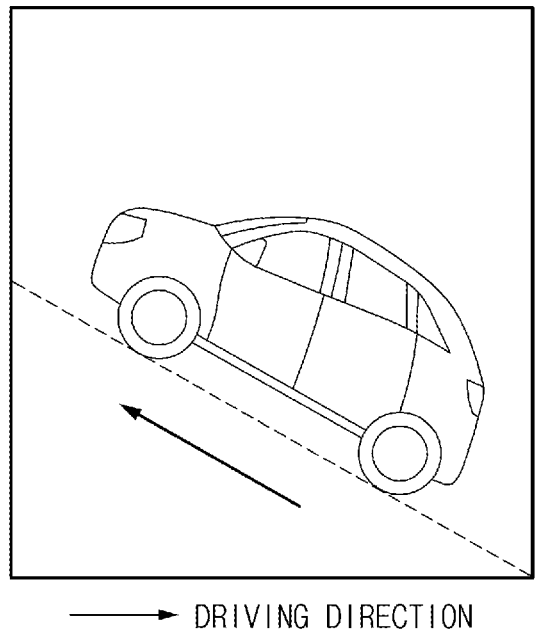
Figure 10B:
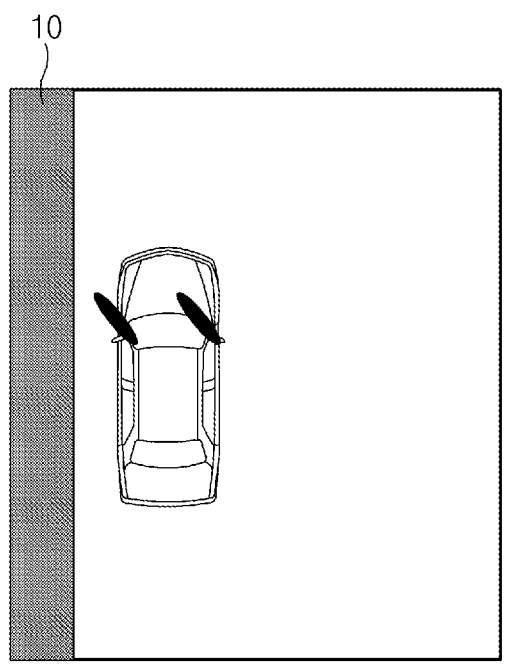

In addition, as shown in FIGS. 9A and 9B, when the controller 150 determines that the vehicle is located on a downhill road and a surrounding structure 90 is located at a location adjacent to the left side of the vehicle within a specified distance, the controller 150 may determine the left as the steering direction. As shown in FIGS. 10A and 10B, when the controller 150 determines that the vehicle is located on an uphill road and a surrounding structure 10 is located within a specified distance from the left side of the vehicle, the controller 150 may determine to the left as the steering direction.

Although not shown, when the controller 150 determines that the vehicle is located on a flat road, the controller 150 may determine the steering direction to a sensor (center) regardless of the location of a surrounding structure or an obstacle.

As described above, the controller 150 may calculate the steering direction and steering angle and transmits the calculated information to the portable terminal 200. When the controller 150 receives the steering control command from the portable terminal 200 while waiting until the steering control command is received from the portable terminal 200, the controller 150 may control the steering based on the received steering control command.

That is, the controller 150 may provide the optimal steering direction and steering angle calculated based on the vehicle surrounding environment information to allow the user to reflect it in setting the steering command, and may ultimately control the steering based on the steered control command generated by the user's intention.

Even after the controller 150 receives the steering control command from the portable terminal 200 and steering of the vehicle is controlled based on the received steering control command, the controller 150 may monitors whether the slip occurs, wait until the driver returns, and transmit the surrounding image and control history of the vehicle to the portable terminal 200.

Figure 11:
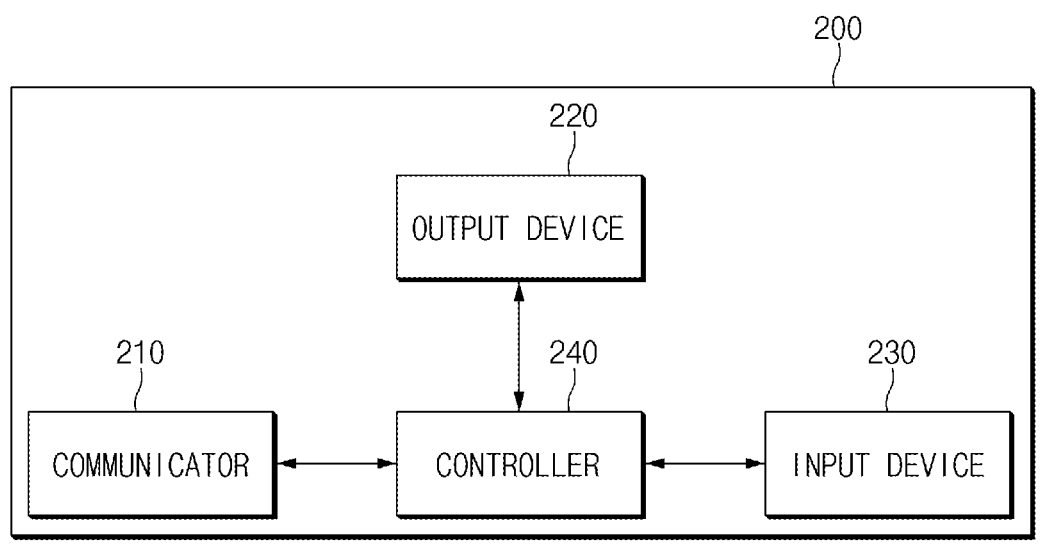
FIG. 11 is a block diagram illustrating the configuration of a portable terminal according to an embodiment of the present disclosure.

FIG. 11 is a block diagram illustrating the configuration of a portable terminal according to an embodiment of the present disclosure.

As shown in FIG. 11, the portable terminal 200 may include a communicator 210, an output device 220, an input device 230, and a controller 240.

The communicator 210 may perform wireless communication with the portable terminal 200. According to an embodiment, the communicator 210 may communicate with the communicator 140 of the vehicle control apparatus in various communication schemes such as Wi-Fi, WiBro, global system for mobile communication (GSM), code division multiple access (CDMA), wideband code division multiple access (WCDMA), universal mobile telecommunication system (UMTS), time division multiple access (TDMA), long term evolution (LTE), and the like. According to an embodiment, the communicator 210 may receive the steering direction and steering angle calculated from the vehicle control apparatus 100. In addition, the communicator 210 may transmit the steering control command generated by the controller 240 to the vehicle control apparatus 100.

The output device 220 may display a steering menu including a steering angle and a steering direction received from the vehicle. To this end, the output device 220 may be implemented with a display device. According to an embodiment, the output device 220 may output a steering menu as shown in following Table 1.

TABLE 1

| | 1 | 2 | 3 | 4 | 5 | 6 | 7 | 8 |
|---|---|---|---|---|---|---|---|---|
| Steering direction | \\ | \\ | // | // | \/ | /\ | \|\| | Maintain current state |
| Steering angle | Full turn | Display calculated angle | Full turn | Display calculated angle | — | — | — | |

In addition, when the control history and the return request message is received from the vehicle control apparatus, the output device 220 may output the received information. The input device 230 may receive an input signal corresponding to a manipulation, an operation or a voice of a user and according to an embodiment of the present disclosure, the input device 230 may receive an operation of a user. To this end, the input device 230 may be implemented with a button, a touch screen, and the like. When the input device 230 is a touch screen, the input device 230 may be implemented integrally with the output device 220.

According to an embodiment of the present disclosure, when one of images in Table 1 output to the output device 220 is selected by the user, the input device 230 may receive an input signal corresponding to the selected image.

The controller 240 may be implemented with various processing devices such as a microprocessor equipped with a semiconductor chip capable of performing operations or executions of various commands, and may control the operation of the vehicle control apparatus according to an embodiment.

When the controller 240 receives the control history and return request message from the vehicle control apparatus 100, the controller 240 may allow the output device 220 to output the control history and return request message and output the steering menu including the steering direction and steering angle information calculated from the vehicle control apparatus 100.

The controller 240 may generate a steering control command based on the input signal input to the input device 230 and may transmit the steering control command to the vehicle control apparatus when the steering control command is generated.

Figure 12:
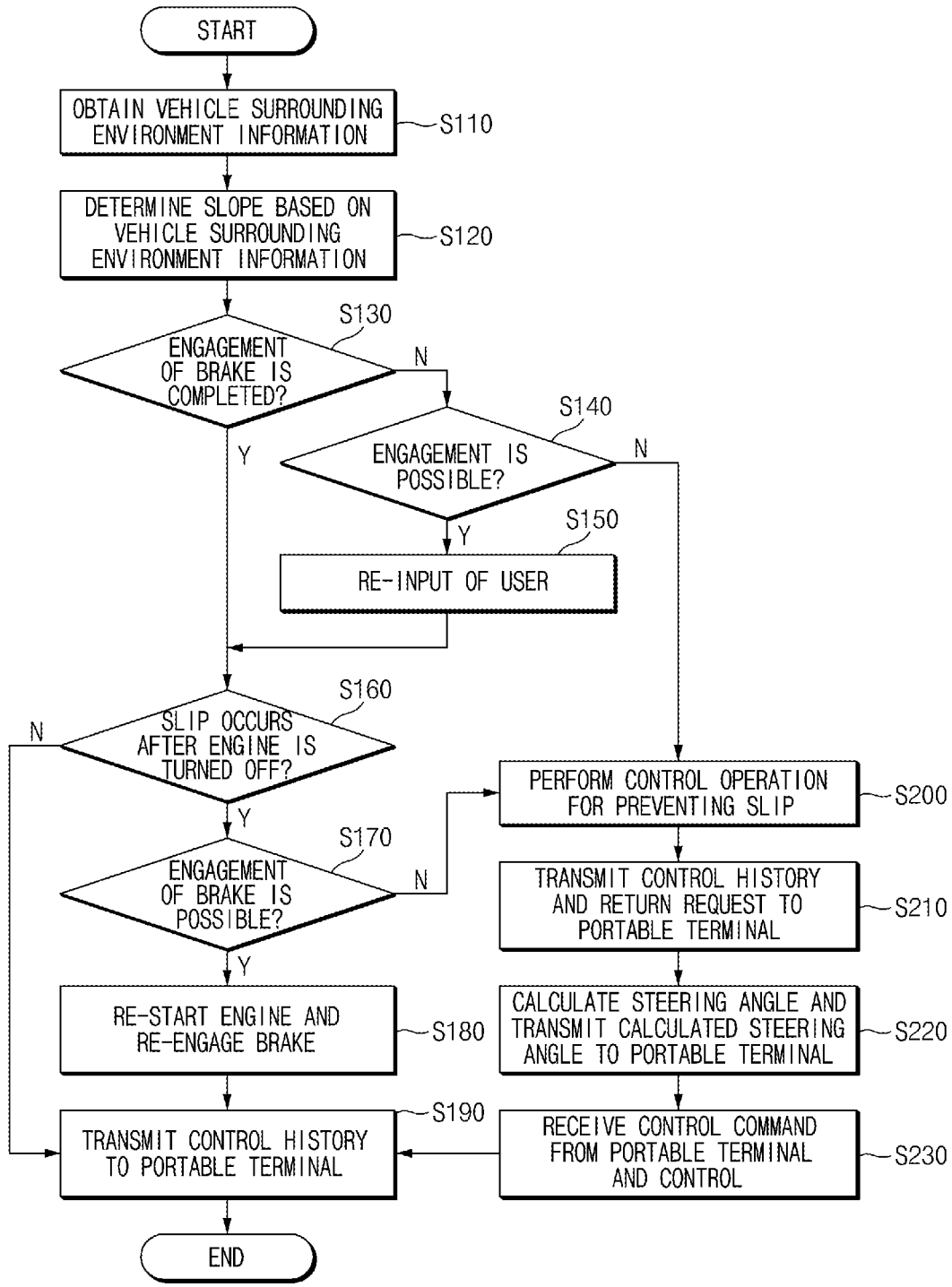
FIG. 12 is a flowchart illustrating a vehicle control method according to an embodiment of the present disclosure.

FIG. 12 is a flowchart illustrating a vehicle control method according to an embodiment of the present disclosure.

As shown in FIG. 12, in operation S110, the controller 150 obtains vehicle surrounding environment information. In operation S110, the controller 150 may determine the parking location based on the vehicle surrounding environment information. According to an embodiment, when the vehicle is parked in an automatic parking scheme, the controller 150 may determine whether the parking location of the vehicle is located at the left or right side based on the driving direction of the vehicle after the automatic parking operation is completed. In addition, when the vehicle is parked in a manual parking scheme, the controller 150 may determine the location of the surrounding structure when the engine is turned off after the manual parking operation is completed. According to an embodiment, the controller 150 may determine whether a surrounding structure such as a curb is located close to the left or right side of the vehicle based on the driving direction of the vehicle. For more details, refer to the descriptions of FIGS. 3 and 4.

In operation S120, the controller 150 may determine the slope of a road based on the vehicle surrounding environment information. In operation S120, the slope of the road may be determined based on the angle between the ground surface and the road surface, and the slope may be determined based on the image obtained through the front or rear camera. According to an embodiment, the controller 150 may determine whether the vehicle is parked on an uphill or downhill road based on the slope of the road.

When it is determined that the vehicle is parked on an uphill or downhill road, in operation S130, the controller 150 may determine that the transmission shift lever of the vehicle is positioned in 'P' at the time when the vehicle is parked, and determine whether the engagement of the electronic parking brake is completed. When the transmission shift lever is positioned in 'P' and it is determined that the engagement of the brake is completed in operation S130 (Y), in operation S160, the controller 150 may determine whether the slip (sliding on the slope road) occurs after the vehicle is turned off. In S160, the controller 150 may determine that the slip has occurred when information about the distance traveled of the wheel is received in the ignition-on state for a predetermined time (e.g., one minute) after the vehicle is turned off.

Although it is determined in operation S130 that the engagement of the electronic parking brake is completed, when it is determined in operation S160 that the slip occurs, in operation S170, the controller 150 may determine whether the re-engagement of the electronic parking brake is possible. When it is determined in operation S170 that the re-engagement of the electronic parking brake is possible (Y), in operation S180, the controller 150 may control the engine to restart, and control the electronic parking brake to be re-engaged, and then turn off the engine. Thereafter, in operation S190, the controller 150 may control to transmit the control history (history of engine restart and start-off) performed after the sleep to the portable terminal 200. In operation S190, the controller 150 may control to transmit the vehicle surrounding image obtained through the camera 120 to the portable terminal 200.

When it is determined in operation S130 that the engagement of the electronic parking brake is not completed (N), in operation S140, the controller 150 may determine whether the engagement is possible. When it is determined in operation S140 that the engagement of the electronic parking brake is possible (Y), in operation S150, the controller 150 receives the operation signal of the electronic parking brake again at the time when the vehicle is turned off, such that the engagement of the electronic parking brake is completed.

However, when it is determined in operation S140 that the engaging force of the electronic parking brake is lowered or a failure occurs so that it is determined that the engagement or re-engagement is impossible (N), or it is determined in operation S170 that the engagement or re-engagement is impossible (N), in operation S200, the controller 150 may restart the engine at the time when the engine is turned off and control the transmission gear to be changed in a direction opposite to the slop direction. In operation S200, according to an embodiment, when it is determined that the vehicle is parked on an uphill road, the controller 150 may change the transmission gear to stage 'D'. When it is determined that the vehicle is parked on a downhill slope, the controller 150 may change the transmission gear to stage 'R'. In addition, when it is determined that the vehicle is parked on a flat road, the controller 150 may change the transmission gear to stage 'N'.

In operation S210, the controller 150 may transmit the control history and a message requesting the user to return to the vehicle to the portable terminal 200 after determining that the engagement of the electronic parking brake is impossible. In operation S220, the controller 150 may wait until a steering control command is received from the portable terminal 200, calculate a steering angle and steering direction optimal to prevent the slip, and transmit the calculated steering angle and steering direction to the portable terminal 200. For detailed description of the operation S220, refer to the descriptions of FIGS. 5A, 5B, 6A, 6B, 7A, 7B, 8A, 8B, 9A, 9B, 10A, and 10B.

In operation S230, the controller 150 may calculate the steering direction and steering angle and transmit the calculated information to the portable terminal 200. In addition, when the controller 150 receives the steering control command from the portable terminal 200 while waiting until the steering control command is received from the portable terminal 200, the controller 150 may control the steering based on the received steering control command.

In operation S190, after the controller 150 receives the steering control command from the portable terminal 200 and steering of the vehicle is controlled based on the received steering control command, the controller 150 may monitor whether the slip occurs, wait until the driver returns, and transmit the surrounding image and control history of the vehicle to the portable terminal 200.

Figure 13:
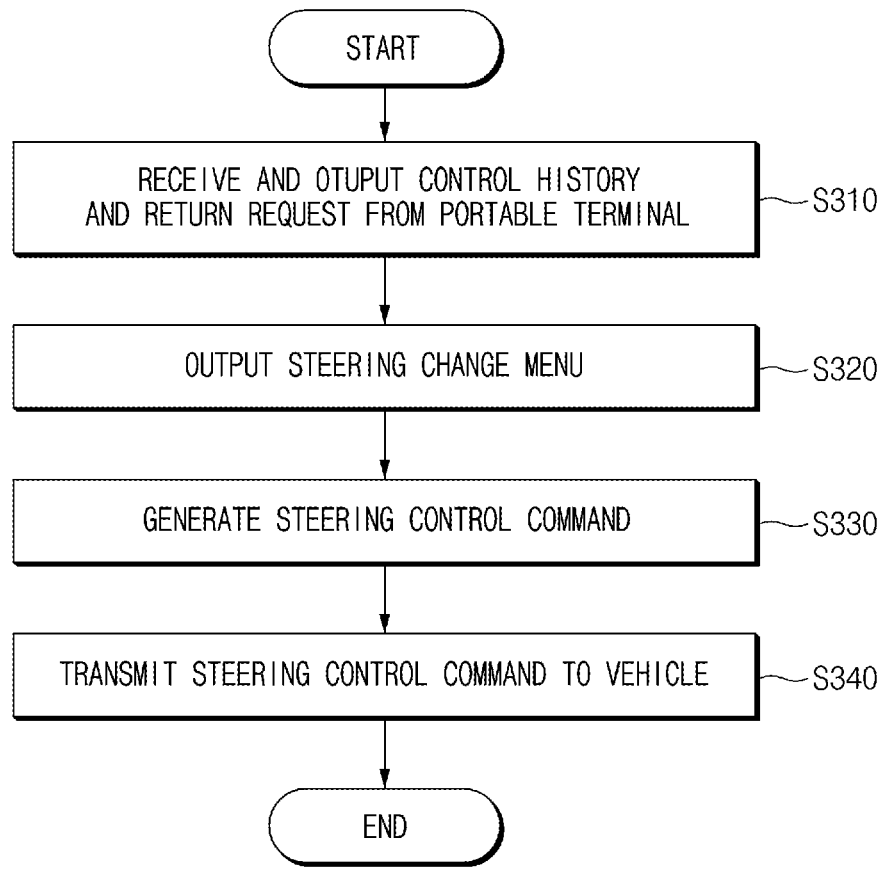
FIG. 13 is a flowchart illustrating a method of operating a portable terminal according to an embodiment of the present disclosure.

FIG. 13 is a flowchart illustrating a method of operating a portable terminal according to an embodiment of the present disclosure.

As shown in FIG. 13, in operation S310, the controller 240 receives the control history and return request message from the vehicle control apparatus 100, and may allow the output device 220 to output the control history and return request message through the output device 220. In operation S320, the controller 240 may control to output the steering menu including the steering direction and steering angle information calculated from the vehicle control apparatus 100. In this case, refer to Table 1 for the steering menu.

The controller 240 may generate a steering control command based on the input signal input to the input device 230 in operation S330, and in operation S340, may transmit the steering control command to the vehicle control apparatus when the steering control command is generated.

Figure 14:
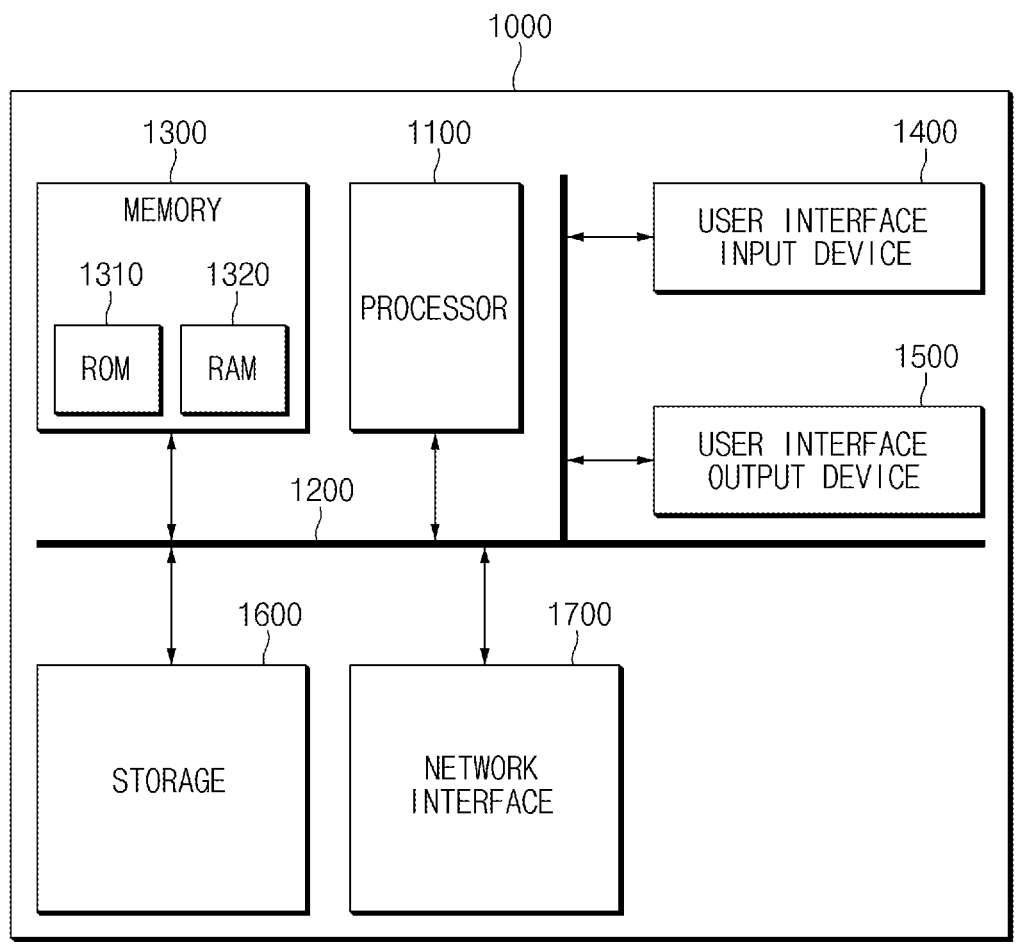
FIG. 14 is a block diagram illustrating a configuration of a computing system executing a method according to an embodiment of the present disclosure.

FIG. 14 is a block diagram illustrating a configuration of a computing system executing a method according to an embodiment of the present disclosure.

Referring to FIG. 14, a computing system 1000 may include at least one processor 1100, a memory 1300, a user interface input device 1400, a user interface output device 1500, storage 1600, and a network interface 1700, which are connected through a system bus 1200.

The processor 1100 may be a central processing device (CPU), or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to embodiments the present disclosure, the apparatus, system and method for controlling a vehicle are capable of securing safety by fundamentally preventing slip when a vehicle is parked on a sloping road.

The above description is a simple exemplification of the technical spirit of the present disclosure, and the present disclosure may be variously corrected and modified by those skilled in the art to which the present disclosure pertains without departing from the essential features of the present disclosure.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. An apparatus for controlling a vehicle, the apparatus comprising:
    a sensor configured to obtain vehicle surrounding environment information and vehicle driving information; and
    a controller configured to:
        determine whether an engagement of an Electronic Parking Brake (EPB) is possible based on the vehicle driving information,
        perform control for preventing a slip based on the vehicle surrounding environment information upon determining that the engagement of the EPB is impossible,
        calculate a steering angle for preventing the slip, transmit the steering angle to a portable terminal,
        receive a steering control command from the portable terminal, and control steering based on the received steering control command.

2. The apparatus of claim 1, wherein the controller operates the EPB and determines whether the slip occurs after the EPB is engaged upon determining that the engagement of the EPB is possible.

3. The apparatus of claim 2, wherein the controller determines whether a re-engagement of the EPB is possible upon determining that the slip occurs after the EPB is engaged.

4. The apparatus of claim 3, wherein the controller performs the control for preventing the slip upon determining that the re-engagement of the EPB is impossible.

5. The apparatus of claim 1, wherein the controller determines a slope of a road based on the vehicle surrounding environment information, and performs the control for preventing the slip based on the slope of the road upon determining that the vehicle is located on a sloping road.

6. The apparatus of claim 1, wherein the control for preventing the slip includes control for restarting an engine at a time when the engine is turned off and changing a transmission gear ratio based on the vehicle driving information.

7. The apparatus of claim 1, wherein the controller transmits a control history and a return request message of a user to the portable terminal when the control for preventing the slip is performed.

8. The apparatus of claim 1, wherein the controller calculates the steering angle based on a movement trajectory of the vehicle and a location of an obstacle when the slip occurs.

9. The apparatus of claim 1, wherein the controller determines that a curb is located at a left side of the vehicle based on the vehicle surrounding environment information, and determines a steering direction to left upon determining that the vehicle is parked at a left side of a driving direction of the vehicle.

10. The apparatus of claim 1, wherein the controller determines that a curb is located at a right side of the vehicle based on the vehicle surrounding environment information, and determines a steering direction to right when the controller determines that the vehicle is parked at a right side of a driving direction of the vehicle.

11. The apparatus of claim 1, further comprising a camera configured to obtain the vehicle surrounding environment information in an image.

12. A system for controlling a vehicle, the system comprising:
a portable terminal configured to generate a steering control command; and
a vehicle driving control apparatus configured to:
obtain vehicle surrounding environment information and vehicle driving information,
determine whether an engagement of an EPB is possible based on the vehicle driving information,
perform control for preventing a slip based on the vehicle surrounding environment information upon determining that the engagement of the EPB is impossible,
calculate a steering angle for preventing the slip, transmit the calculated steering angle to the portable terminal,
receive a steering control command from the portable terminal, and
control steering based on the received steering control command.

13. A method of controlling a vehicle, the method comprising:
obtaining vehicle surrounding environment information and vehicle driving information;
determining whether an engagement of an electronic parking brake (EPB) is possible based on the vehicle driving information to perform control for preventing a slip based on the vehicle surrounding environment information when the engagement of the EPB is impossible;
calculating a steering angle for preventing the slip and transmitting the calculated steering angle to a portable terminal; and
receiving a steering control command from the portable terminal and controlling steering based on the received steering control command.

14. The method of claim 13, further comprising operating the EPB and determining whether the slip occurs after the EPB is engaged upon determining that the engagement of the EPB is possible.

15. The method of claim 14, further comprising determining whether a re-engagement of the EPB is possible upon determining that the slip occurs after the EPB is engaged.

16. The method of claim 15, further comprising performing the control for preventing the slip upon determining that the re-engagement of the EPB is impossible.

17. The method of claim 13, wherein the performing the control for preventing the slip includes determining a slope of a road based on the vehicle surrounding environment information,
wherein the control for preventing the slip is performed based on the slope of the road upon determining that the vehicle is located on a sloping road.

18. The method of claim 13, wherein the control for preventing the slip includes control for restarting an engine at a time when the engine is turned off and changing a transmission gear ratio based on the vehicle driving information.

19. The method of claim 13, further comprising transmitting a control history and a return request message of a user to the portable terminal when the control for preventing the slip is performed.

20. The method of claim 13, wherein the steering angle is calculated based on a movement trajectory of the vehicle and a location of an obstacle when the slip occurs.

* * * * *